United States Patent
Noma

(10) Patent No.: US 7,304,463 B2
(45) Date of Patent: Dec. 4, 2007

(54) DC-DC CONVERTER

(75) Inventor: Takashi Noma, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/115,754

(22) Filed: Apr. 27, 2005

(65) Prior Publication Data

US 2005/0285585 A1   Dec. 29, 2005

(30) Foreign Application Priority Data

Jun. 29, 2004   (JP) .............................. 2004-191514

(51) Int. Cl.
  *G05F 1/618* (2006.01)
  *G05F 1/575* (2006.01)
(52) U.S. Cl. .................................... 323/284
(58) Field of Classification Search ........ 323/222–225, 323/271, 282, 284, 285, 351
  See application file for complete search history.

(56) References Cited

U.S. PATENT DOCUMENTS

| | | | |
|---|---|---|---|
| 6,472,856 B2* | 10/2002 | Groom et al. | 323/284 |
| 6,577,110 B2* | 6/2003 | Van Auken | 323/282 |
| 6,747,441 B2* | 6/2004 | Johnson et al. | 323/282 |
| 6,812,782 B2* | 11/2004 | Grant | 327/589 |
| 6,979,985 B2* | 12/2005 | Yoshida et al. | 323/282 |
| 7,199,561 B2* | 4/2007 | Noma | 323/224 |

FOREIGN PATENT DOCUMENTS

| | | |
|---|---|---|
| JP | 09-051672 | 2/1997 |
| JP | 10-164841 | 6/1998 |
| JP | 2000-350440 | 12/2000 |
| JP | 2001-112241 | 4/2001 |
| JP | 2003-088117 | 3/2003 |
| JP | 2003-224972 | 8/2003 |
| JP | 2003-224973 | 8/2003 |
| JP | 2004-201474 | 7/2004 |

OTHER PUBLICATIONS

Official communication issued in the counterpart Chinese Application No. 200510076539.6, mailed on Sep. 14, 2007.

* cited by examiner

Primary Examiner—Gary L. Laxton
(74) Attorney, Agent, or Firm—Keating & Bennett, LLP

(57) ABSTRACT

A DC-DC converter includes an Nch $FET_1$ which is series connected between an input terminal and an output terminal, and an Nch $FET_2$ which is connected between the output terminal side of the Nch $FET_1$ and a ground terminal. On the output terminal side of the circuits, a smoothing circuit and a comparator circuit are connected. The output side of the comparator circuit is connected to an on-time limiter circuit, and the on-time limiter circuit is connected to an H/S driver circuit for controlling the Nch $FET_1$ through an inverter and directly connected to an L/S driver circuit for controlling the Nch $FET_2$. Here, when a switching control signal for turning on the Nch $FET_1$ is input to the on-time limiter circuit from the comparator, the on-time limiter circuit detects a time in the on state and outputs a signal by which the Nch $FET_1$ is temporarily off controlled.

20 Claims, 6 Drawing Sheets

DC-DC CONVERTER

BACKGROUND OF THE INVENTION

1. Field of the Invention

The present invention relates a DC-DC converter for step-down converting an input DC voltage to a DC voltage having a predetermined value, and more particularly, to a step-down ripple detection type self-oscillation converter.

2. Description of the Related Art

At the present time, low-voltage and high-current DC-DC converters are required because of the demand for computer power-supply circuits. As representatives of such DC-DC converters, PWM control converters and ripple detection type self-oscillation converters (hereinafter, simply referred to as ripple converters) are utilized. Among them, ripple converters have lately attracted some attention even though the later-developed PWM control converters have been overwhelmingly popular, because the response to load variations is good with ripple converters.

FIG. 5 shows a basic circuit of a ripple converter.

As shown in FIG. 5, in the ripple converter, a PNP transistor $Tr_1$ defining a switching element and an inductor $L_{01}$ which are series connected, are disposed between an input terminal 3 at which an input voltage Vin is input and an output terminal 4 at which an output voltage Vout is output, and a flywheel diode connected between the connection point of the PNP transistor $Tr_1$ to the inductor $L_{01}$ and the ground is provided. Furthermore, a comparator 10, in which a voltage in accordance with an output voltage Vout is input to a non-inverting input terminal, a reference voltage Vo is input to an inverting input terminal, and a switching control signal is output to the PNP transistor $Tr_1$, is provided.

In such a ripple converter, while the PNP transistor $Tr_1$ is in the off state, when the output voltage Vout becomes less than the reference voltage Vo, a low signal output from the comparator is input to the base of the PNP transistor $Tr_1$ and the PNP transistor $Tr_1$ is turned on. Then, the output voltage Vout increases such that the PNP transistor $Tr_1$ is turned on. On the other hand, while the PNP transistor $Tr_1$ is in the on state, when the output voltage Vout becomes greater than the reference voltage Vo, a high signal is output from the comparator and input to the base of the PNP transistor $Tr_1$, and as a result, the PNP transistor $Tr_1$ is turned off. Then, the output voltage Vout is reduced such that the PNP transistor $Tr_1$ is turned off. By repeating such a control operation, the output voltage Vout goes up and down around a voltage that is close to the reference voltage Vo and an output voltage Vout which substantially equal to the reference voltage Vo is obtained.

In a practical circuit of such a ripple converter disclosed in Japanese Unexamined Patent Application Publication No. 9-51672, a ripple converter having a structure in which a switching element of a Pch FET and a choke coil are connected between an input terminal and an output terminal, and a diode is connected between the connection point of the Pch FET to the choke coil and the ground potential. Furthermore, in the ripple converter described in JP 9-51672, a comparator in which a voltage in accordance with an output voltage is input to an inverting input terminal and a reference voltage is input to a non-inverting input terminal and a drive IC which outputs a switching control signal to the Pch FET in accordance with the output voltage of the comparator are provided. Then, in this ripple converter, a desired output voltage is obtained from input voltage such that the output voltage is compared to a reference voltage and, based on the results of the comparison, the Pch FET is switched.

When compared with Nch FETs, Pch FETs have less desirable characteristics. So if the Pch FET is used in a synchronous rectification type ripple converter, the conversion efficiency is degraded. Therefore, a synchronous rectification type ripple converter using the Nch FET is required, instead of the Pch FET.

In such a ripple converter using an Nch FET, a higher voltage than the source voltage must be applied to the gate in order to drive the FET, and a bootstrap circuit shown in FIG. 6A is typically required on the control signal input side of the Nch FET.

FIG. 6A is a circuit diagram of a synchronous rectification type ripple converter using an Nch FET in which a related bootstrap circuit is provided, and FIG. 6B shows voltage waveforms at fixed points (point A and point B) in the circuit shown in FIG. 6A.

As shown in FIG. 6A, an Nch $FET_1$ (hereinafter, referred to as an $FET_1$) and an inductor $L_1$ are series-connected between an input terminal 3 at which an input voltage Vin is input and an output terminal 4 at which an output voltage Vout is output. A bootstrap circuit including a bootstrap diode $D_0$ and a bootstrap capacitor $C_0$ which are series connected to each other is provided between the drain and source of the $FET_1$. An H/S driver circuit 1 is connected to the gate of the $FET_1$. The voltages at both ends of the bootstrap capacitor $C_0$ are applied to the H/S driver circuit 1. The gate of an Nch $FET_2$ (hereinafter, referred to as an $FET_2$) is connected to an L/S driver circuit 2, the drain is connected to the connection point between the $FET_1$ and the inductor $L_1$, and the source is grounded. The L/S driver circuit 2 is connected between the input terminal 3 and the ground. Furthermore, a capacitor $C_1$ is connected between the connection point of the inductor $L_1$ to the output terminal 4 and the ground. Moreover, an illustration of a comparator which detects the ripple of an output voltage Vout and supplies a FET switching signal to the H/S driver circuit 1 and the L/S driver circuit 2 is omitted.

In such a ripple converter, the voltages having waveforms shown in FIG. 6B are generated at point B and point A in FIG. 6A, such that the output characteristics of the $FET_1$ and $FET_2$ are reversed and synchronized therebetween. When the $FET_1$ is turned on at point A (the $FET_2$ is turned off), substantially the same voltage as the input voltage Vin is supplied at point A, and, when the $FET_1$ is turned off (the $FET_2$ is turned on), approximately zero volts (ground potential) are supplied at point A. Then, a voltage obtained by subtracting the voltage drop in the bootstrap diode $D_0$ from the input voltage Vin is applied to the bootstrap capacitor $C_0$, so as to charge the capacitor $C_0$. Therefore, at point B, when the $FET_1$ is turned on (the $FET_2$ is turned off), a voltage increasing above the input voltage Vin by the electric charge charged in the bootstrap capacitor $C_0$ is generated, and, when the $FET_1$ is turned off (the $FET_2$ is turned on), a voltage obtained by subtracting the voltage drop in the bootstrap diode $D_0$ from the input voltage Vin is generated.

In such a structure, as described above, since an increased drive control voltage of the $FET_1$ is generated from the H/S driver circuit 1, such that the charged bootstrap capacitor $C_0$ is discharged, the $FET_1$ must be repeatedly turned on and off. That is, the $FET_1$ is not continuously in the on state and the $FET_1$ must be switched on and off at a certain duty factor. Moreover, a duty factor mentioned here represents the ratio, expressed by percentage, of the time that the $FET_1$ is in the on state all of the time, that is, if the $FET_1$ is constantly in the on state, the duty factor is 100%.

However, as shown in FIG. 5, the ripple converter does not include any circuit for controlling a duty factor and the duty factor cannot be effectively controlled in principle. Therefore, when the input voltage Vin is decreased, the output voltage Vout does not reach the reference voltage Vo, and the $FET_1$ is constantly in the on state, then, as a result, the bootstrap capacitor $C_0$ is completely discharged. When the bootstrap capacitor $C_0$ is discharged, the voltage across the capacitor $C_0$ cannot be increased, a voltage required for the gate of the $FET_1$ cannot be supplied, and as a result, the FET, is turned off. Therefore, the output voltage Vout is further reduced.

Thus, when the output voltage Vout is reduced, as described above, a voltage cannot be supplied from the bootstrap capacitor $C_0$. Accordingly, the $FET_1$ cannot be turned on, and the output voltage Vout is further reduced. That is, the $FET_1$ cannot be stably operated such that the bootstrap capacitor is completely discharged.

SUMMARY OF THE INVENTION

To overcome the problems described above, preferred embodiments of the present invention provide a ripple converter type DC-DC converter in which a predetermined voltage is stably output.

According to a preferred embodiment of the present invention, a DC-DC converter includes an Nch FET for on-off controlling an input voltage, a smoothing circuit for smoothing a switched output voltage from the Nch FET to output the smoothed voltage, and a comparator circuit for comparing a voltage output from the smoothing circuit with a set voltage to output a switching control signal for the on-off controlling. In the DC-DC converter, when a continuous on time of the Nch FET is detected and the continuous on time reaches a predetermined time, a switching control signal for off controlling the Nch FET is output to the Nch FET.

When the Nch FET is in the off state (the Nch FET is turned off) and the output voltage of the smoothing circuit (output voltage of the converter) is less than a set voltage, a switching control signal for turning on the Nch FET is output from the comparator circuit. Here, when the on state continues for a predetermined time, that is, the state where the voltage input to the comparator is less than a set voltage, continues for a predetermined time or more, the on-time limiter circuit outputs a switching control signal for temporarily turning off the Nch FET. Thus, the Nch FET is turned off and the bootstrap capacitor connected to the switching circuit for controlling the switching of the Nch FET is rapidly charged. Even if such an off control is performed, since a voltage in accordance with the DC output voltage is less than the reference voltage, a switching control signal for turning on the Nch FET once again is input to the Nch FET and the Nch FET is turned on. In this manner, the bootstrap circuit continuously functions, such that the switching of the Nch FET is repeated.

Furthermore, according to a DC-DC converter of a preferred embodiment of the present invention, in the on-time limiter circuit, a time limit in the on state is about three to about ten times as long as a cycle of the switching control signal during normal operation.

Thus, the off state is more effectively achieved, such that the time limit in the on state is set as described above.

According to preferred embodiments of the present invention, even if the Nch FET continues to be in the on state, since a temporary time in the off state is provided, the bootstrap capacitor can be charged during the off time. Therefore, the Nch FET is consecutively maintained in the on state, and the Nch FET is stably operated. Thus, a ripple converter type DC-DC converter for stably outputting a predetermined voltage is provided.

Furthermore, according to preferred embodiments of the present invention, a ripple converter type DC-DC converter for more stably outputting a predetermined voltage is provided, such that the time limit in the on state is set in an appropriate range as described above.

These and other features, elements, characteristics and advantages of the present invention will become more apparent from the following detailed description of preferred embodiments of the present invention with reference to the attached drawings.

DETAILED DESCRIPTION OF PREFERRED EMBODIMENTS

A ripple converter type DC-DC converter according to a preferred embodiment of the present invention is described with reference to FIGS. 1 to 4.

Figure 1:
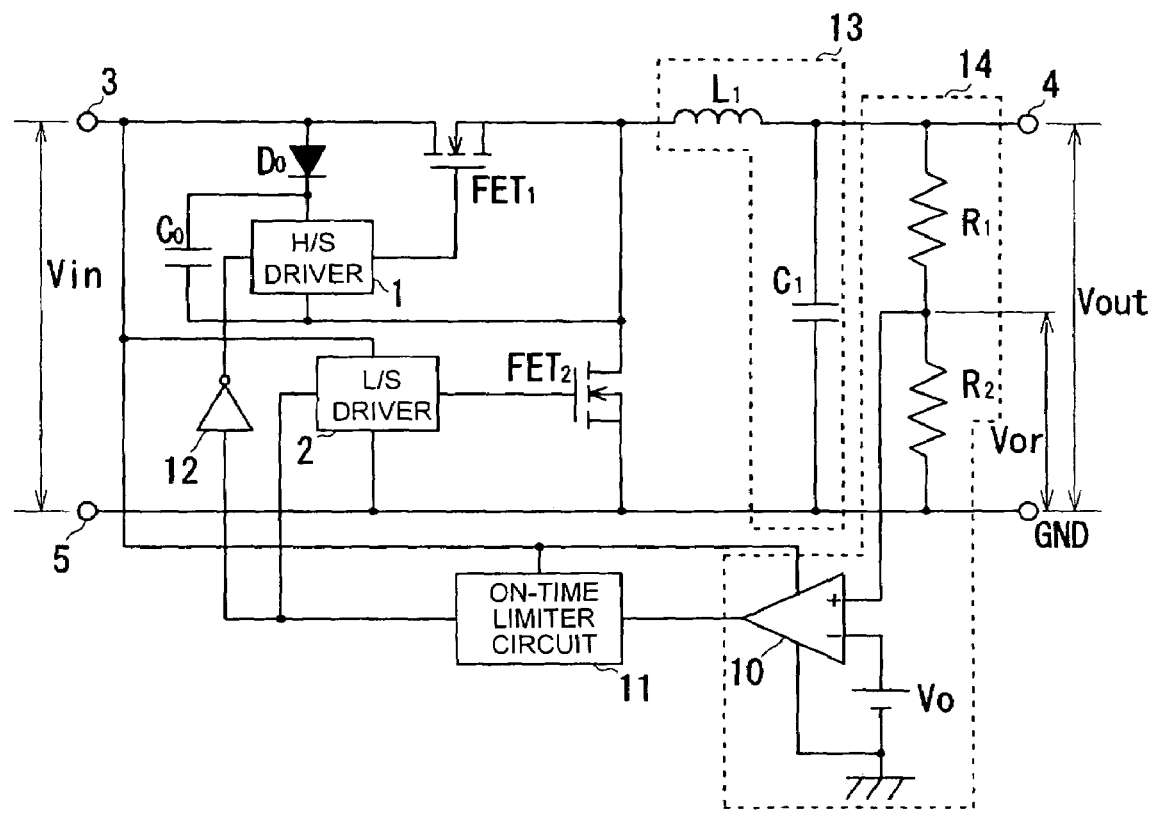
FIG. 1 is a circuit diagram showing the structure of a ripple converter of a preferred embodiment of the present invention.

FIG. 1 is a circuit diagram showing the structure of a ripple converter of the present preferred embodiment.

Figure 2:
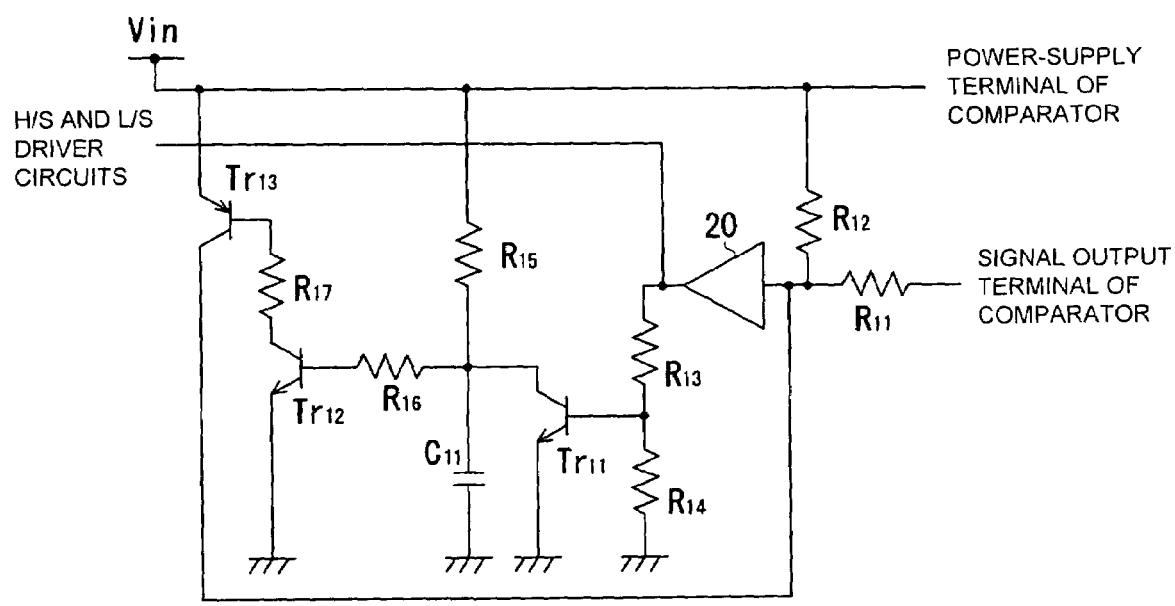
FIG. 2 is the detailed circuit diagram of an on-time limiter circuit shown in FIG. 1.

Furthermore, FIG. 2 shows the detailed circuit of an on-time limiter circuit 11 in FIG. 1.

As shown in FIG. 1, in the ripple converter of the present preferred embodiment, an Nch $FET_1$ (hereinafter, simply referred to as an $FET_1$) and an inductor $L_1$ are series-connected in order from the side of an input terminal 3 between the input terminal 3 and an output terminal 4. Here, in the $FET_1$, the drain is connected to the input terminal 3 and the source is connected to the inductor $L_1$. Furthermore, the gate of the $FET_1$ is the control signal output terminal of an H/S driver circuit 1. Moreover, between the drain and source of the $FET_1$, a bootstrap circuit is provided which includes a bootstrap diode $D_0$ and a bootstrap capacitor $C_0$ which are series-connected. In the bootstrap circuit, the anode of the bootstrap diode $D_0$ is connected to the drain of the $FET_1$ and the input terminal 3, and the bootstrap capacitor $C_0$ is connected to the source of the $FET_1$.

In the driver circuit 1, the power-supply input terminal is connected to the connection point between the cathode of the bootstrap $D_0$ and the bootstrap capacitor $C_0$ in the bootstrap circuit, and the ground-side terminal is connected to the connection point between the bootstrap capacitor $C_0$ and the source of the $FET_1$. Thus, the voltage charged in the bootstrap capacitor $C_0$ of the bootstrap circuit is applied to the H/S driver circuit. Furthermore, an on-time limiter circuit 11, to be described later, is connected to a signal input terminal of the H/S driver circuit 1 through an inverter 12, and a signal output from the on-time limiter circuit 11 is inverted and input to the signal input terminal.

An Nch $FET_2$ (hereinafter, referred to as an $FET_2$) is connected between the connection point of the $FET_1$ to the inductor $L_1$ and the ground terminal 5. Here, in the $FET_2$, the drain is connected to the connection point between the $FET_1$ and the inductor $L_1$ and the source is connected to the ground terminal 5. Furthermore, the gate of the $FET_2$ is connected to the control signal output terminal of an L/S driver circuit 2.

In the L/S driver circuit 2, the power-supply input terminal is connected to the input terminal 3, and the ground-side terminal is connected to the ground terminal 5. Furthermore, to the signal input terminal of the L/S driver circuit 2, the on-time limiter circuit 11 is connected and a signal output from the on-time limiter circuit 11 is directly input.

Between the connection point of the inductor $L_1$ to the output terminal 4 and the ground terminal 5, a capacitor $C_1$ is connected and a series circuit of resistors $R_1$ and $R_2$ is connected in parallel with the capacitor $C_1$.

The connection point of the resistors $R_1$ and $R_2$ is connected to a non-inverting input terminal of a comparator 10.

The inverting input terminal of the comparator 10 is connected to the plus side of a reference voltage $V_0$ and the minus side-of the reference voltage is grounded. Furthermore, the positive-side power-supply terminal of the comparator 10 is connected to the input terminal 3, and the negative-side power-supply terminal is grounded. Moreover, a signal output terminal of the comparator 10 is connected to a signal input terminal of the on-time limiter circuit 11. A high signal and a low signal generated by comparing the voltage input to the inverting input terminal of the comparator 10 and the voltage input to the non-inverting input terminal correspond to a switching control signal of the present invention.

Furthermore, a smoothing circuit preferably includes the inductor $L_1$ and the capacitor $C_1$, and a comparator circuit 14 preferably includes the comparator 10, the resistors $R_1$ and $R_2$, and the reference power supply.

The on-time limiter circuit 11 has the signal input terminal, the power-supply terminal, and the signal output terminal. The power-supply terminal is connected to the input terminal 3, and the signal output terminal is connected to the L/S driver circuit 2 and to the H/S driver circuit 1 through the inverter 12.

A specific structure of the on-time limiter circuit 11 is described with reference to FIG. 2.

The input portion of a buffer circuit 20 is connected to the signal output terminal of the comparator 10 through a resistor R11 and to the input terminal through a resistor R12. The output portion of the buffer circuit 20 is connected to the H/S driver circuit 1 through the inverter 12 and directly to the L/S driver circuit 2. Furthermore, the output portion of the buffer circuit 20 is grounded through a series circuit of resistors $R_{13}$ and $R_{14}$, and the connection point of the resistors $R_{13}$ and $R_{14}$ is connected to the base of an NPN transistor $Tr_{11}$.

In the NPN transistor $Tr_{11}$, the emitter is grounded, and the collector is connected to the base of an NPN transistor $Tr_{12}$, through a resistor $R_{16}$. Furthermore, the collector of the NPN transistor $Tr_{11}$ is connected to the input terminal 3 through a resistor $R_{15}$ and grounded through a capacitor $C_{11}$. The resistor $R_{15}$ and the capacitor $C_{11}$ define a time-constant circuit for setting the maximum value of an on time.

In the NPN transistor $Tr_{12}$, the emitter is grounded and the collector is connected to the base of a PNP transistor $Tr_{13}$ through a resistor $R_{17}$.

In the PNP transistor $Tr_{13}$, the emitter is connected to the input terminal 3 and the collector is connected to the input portion of the buffer circuit 20.

The ripple converter having the above-described structure operates as described below.

At the initial state (where the output voltage is zero volt), a zero-volt voltage is input to the non-inverting input terminal of the comparator 10. Therefore, the comparator 10 outputs zero volt (a low signal). The on-time limiter circuit 11 outputs the low signal to the inverter 12 and the L/S driver circuit 2 through the buffer circuit 20, and the inverter 12 inverts the low signal and outputs a high signal of a predetermined voltage to the H/S driver circuit 1. At this time, the NPN transistor $Tr_{11}$ in the on-time limiter circuit 11 is turned off and the capacitor $C_{11}$ is charged by an input voltage $V_{in}$ through the resistor $R_{15}$ at a predetermined time constant.

When the high signal is input, the H/S driver circuit 1 generates a gate-on control signal (hereinafter, referred to as an on control signal) and outputs the signal to the gate of the $FET_1$. Then, since the bootstrap capacitor $C_0$ is charged by the input voltage $V_{in}$, an on control signal having a voltage that is greater than the input voltage $V_{in}$ is input to the gate of the $FET_1$. On the other hand, when a low signal is input, the L/S driver circuit 2 generates a gate-off control signal (hereinafter, referred to as an off control signal) and outputs the signal to the gate of the $FET_2$.

Thus, since the $FET_1$ is turned on by an on control signal from the H/S driver circuit 1 and the $FET_2$ is turned off by an off control signal from the L/S driver circuit 2, a voltage in accordance with the input voltage $V_{in}$ is supplied to the output terminal 4 through the smoothing circuit 13 including the inductor $L_1$.

When an output voltage Vout is supplied to the output terminal 4, a voltage Vor ($=V_{out} \times R_2/(R_1+R_2)$) divided by the resistors $R_1+R_2$ connected between the output terminal 4 and the ground terminal 5 is input to the non-inverting input terminal of the comparator 10. When the divided voltage Vor is less than the reference voltage Vo input to the inverting input terminal, the output of the comparator 10 does not change.

Next, when an output voltage Vout which causes the divided voltage Vor to be greater than the reference voltage Vo is output from the output terminal 4, a high signal in accordance with a power-supply voltage corresponding to the input voltage Vin is output from the comparator 10. When a high signal is input from the comparator 10 to the on-time limiter circuit 11, the circuit 11 outputs the high signal to the L/S driver circuit 2 and the inverter 12 through the buffer 20. At this time, the NPN transistor $Tr_{11}$ in the on-time limiter circuit 11 is turned on by a base bias current supplied thereto, and the electric charge stored in the capacitor $C_{11}$ is discharged. Thus, the time-constant circuit returns to the initial state and the on-time limiter circuit 11 does not operate.

The inverter 12 outputs a low signal obtained by inverting the high signal input to the H/S driver circuit 1. When a low signal is input to the H/S driver circuit 1, the circuit 1 generates an off control signal and outputs the signal to the gate of the $FET_1$. On the other hand, when a high signal is input to the L/S driver circuit 2, the circuit 2 generates an on control signal and outputs the signal to the gate of the $FET_2$.

The $FET_1$ is turned off by an off-control signal input thereto, and the $FET_2$ is turned on by an on-control signal input thereto. Thus, the connection point between the drain of the $FET_1$ and the source of the $FET_2$ is made conductive to the ground terminal 5 through the passage between the drain and source of the on-state $FET_2$. In this manner, the output voltage Vout is reduced, such that the voltage Vds (substantially zero volt) between the drain and source of the on-state $FET_2$ is applied to the inductor $L_1$. At this time, a voltage obtained by subtracting the reverse voltage of the bootstrap diode $D_0$ and the voltage Vds between the drain and source of the on-state $FET_2$ from the input voltage Vin is applied to the bootstrap capacitor $C_0$ that is parallel-connected to the H/S driver circuit 1 to charge the capacitor $C_0$.

This operation continues until the divided voltage Vor becomes less than the reference voltage Vo, and, when the divided voltage Vor becomes less than the reference voltage Vo, as described above, the $FET_1$ is turned on and the $FET_2$ is turned off.

Then, an output voltage Vout having a desired voltage value (corresponding to a set voltage of the present invention) set by the reference voltage Vo is continuously output from the output terminal 4.

There are instances where an on-state $FET_1$ continues due to a transient load change. The operation of the ripple converter of the present preferred embodiment in this instance is described below.

When the output voltage Vout is less than a voltage set by the reference voltage Vo and the $FET_1$ in the on state continues, that is, when a divided voltage Vor in accordance with the output voltage Vout is less than the reference voltage Vo, the comparator 10 continues to output a low signal. When a low signal is output from the comparator 10, the NPN transistor $Tr_{11}$ in the off state in the on-time limiter circuit 11 continues. Thus, the input voltage Vin is applied to the capacitor $C_{11}$ through the resistor $R_{15}$ and the capacitor $C_{11}$ continues to be charged at a predetermined time constant. Then, when the voltage between both terminals of the capacitor $C_{11}$ reaches a certain value, a base bias current is supplied to the NPN transistor $Tr_{12}$ and the base obtains a high state to turn on the NPN transistor turns on. Then the base of the PNP transistor $Tr_{13}$ is pulled low and the PNP transistor $Tr_{13}$ is also turned on. Thus, a high signal in accordance with the input voltage Vin is input to the input portion of the buffer circuit 20 through the PNP transistor $Tr_{13}$ such that the PNP transistor $Tr_{13}$ is turned on. The buffer circuit 20 outputs the high signal to the inverter 12 and the L/S driver circuit, and the inverter 12 outputs a low signal inverted from the high signal to the H/S driver circuit 1.

When the H/S driver circuit 1 having the low signal input thereto outputs an off control signal, the $FET_1$ is turned off. On the other hand, when the L/S driver circuit 2 having a high signal input thereto outputs an on control signal, the $FET_2$ is turned on. At this time, the base of the NPN transistor $Tr_{11}$ is in a high state and the NPN transistor $Tr_{11}$ is turned on such that a high signal is output from the buffer circuit 20. As a result, the electric charge charged in the capacitor $C_{11}$ is discharged through the passage between the collector and emitter of the NPN transistor $Tr_{11}$. Accordingly, the NPN transistor $Tr_{12}$ is turned off and the PNP transistor $Tr_{13}$ is also turned off. As a result, the application of a high signal to the input portion of the buffer circuit 20 through the PNP transistor $Tr_{13}$ is stopped.

Even if such an operation is performed, since the divided voltage Vor in accordance with the output voltage Vout input to the non-inverting input terminal of the comparator 10 does not reach the reference voltage Vo, the comparator 10 continues to output a low signal. Then, since no high signal is applied to the input portion of the buffer 20 through the PNP transistor $Tr_{13}$, as described above, a high signal is input to the H/S driver circuit 1 and a low signal is input to the L/S driver circuit 2, and after that, the $FET_1$ is turned on and the $FET_2$ is turned off. Thus, the capacitance $C_{11}$ is charged at a predetermined time constant as described above. Then, the operation is repeated while the divided voltage Vor is less than the reference voltage Vo.

Here, the time constant $\tau_b$ of the bootstrap capacitor $C_0$ (affecting the discharge time) and the maximum pulse width $\tau_p$ of a low signal output from the on-time limiter circuit 11, which is mainly affected by the time constant $R_{15} \times C_{11}$, are set so as to have the relationship of $\tau_b > \tau_p$. When set in this manner, the time at which the bootstrap capacitor $C_0$ is discharged and the voltage for driving the H/S driver circuit 1 cannot be supplied and becomes less than the continuous on time of the $FET_1$ (the time where a low signal continues to be output from the on-time limiter circuit 11) to maintain secure control of the $FET_1$.

In particular, as described below, the ripple converter can be more securely and stably operated such that the continuous on time is set to be about three to about ten times as long as the operation cycle (continuous time of a pair of an on time and an off time) in the stable operation, for example.

First, since the voltage output from the output terminal Vout is obtained such that a voltage in accordance with the input voltage Vin is supplied through the inductor $L_1$ in the smoothing circuit 13 while the FETs are on-off controlled as described above, the voltage becomes a triangular wave which goes up and down around a set voltage that is set based on the reference voltage Vo. Then, the ripple of the output voltage depends on the ripple current of the inductor.

Figure 3:
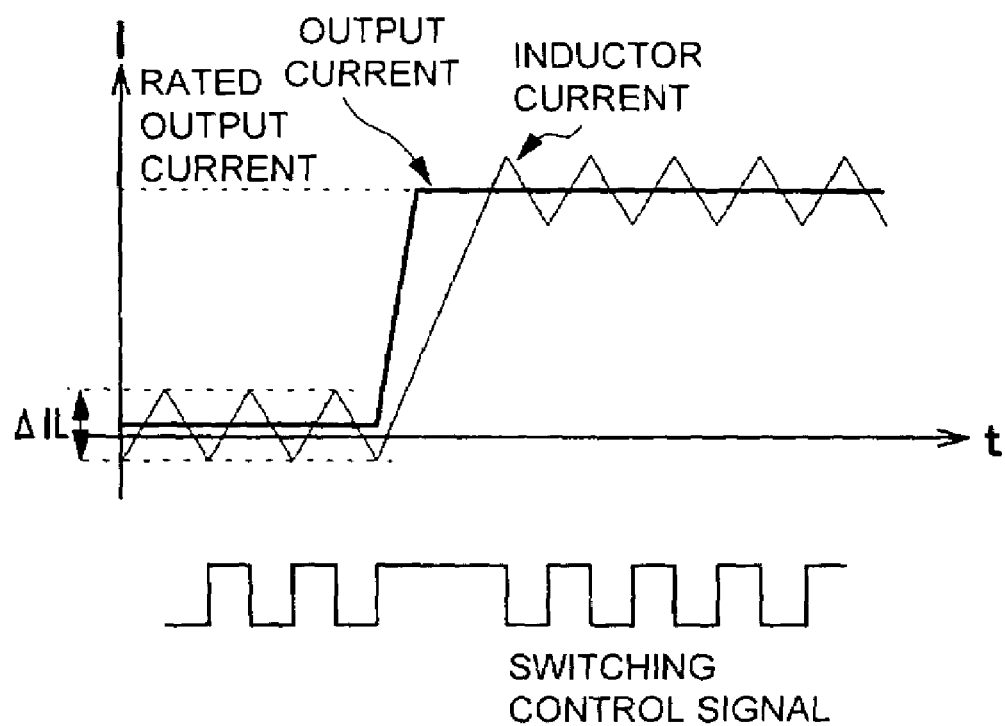
FIG. 3 shows waveforms of a load output current, a ripple current of an inductor, and a switching control signal.

FIG. 3 shows waveforms of an output current of the load (current output from the output terminal), a ripple current of the inductor $L_1$, and a signal (switching control signal) output from the comparator.

Here, the amplitude of the ripple current of the inductor $L_1$ is dependent upon the inductance of the inductor $L_1$. For example, when the inductance is large, the amplitude $\Delta IL$ of the ripple current of the inductor is reduced. Thus, the amplitude of the output ripple current can be decreased to reduce the width of variation of the output voltage. On the other hand, in this manner, when the inductance of the inductor $L_1$ is increased, the speed of change of the coil current decreases in the transient state (at transient load changes) and the width of variation of the output voltage increases. In addition, the size of the inductor must be increased in order to increase the inductance. Accordingly, in order to trade off such advantages against disadvantages, normally the inductance is set so that the amplitude $\Delta IL$ of the ripple current of the inductor is about one third to about one half as large as the rated output current (current normally output from the output terminal 4).

Now, as shown in FIG. 3, when the load current is drastically changed from a low state to a high state, the $FET_1$ must be controlled so that the $FET_1$ may be turned on longer than normal operation. In this manner, the current flowing through the inductor $L_1$ increases to approximately the rated current, such that the $FET_1$ is continuously in the on state. Then, when the output current is close to the rated current, the $FET_1$ is on-off controlled and the rated current is maintained, as described above. At this time, the time in which the $FET_1$ is in the on state, that is, the time where the duty factor is 100% is about three times as long as the switching cycle in normal operation, that is, the repeating cycle of the on state, when the above rated output current is two to three times as large as the amplitude of the ripple current, although dependent on the duty factor in normal operation. Here, the bootstrap capacitor $C_0$ of the bootstrap circuit may be set so as to maintain the voltage for such a time. Accordingly, it is sufficient to set the maximum continuous time so as to be at least about three times the cycle of the switching control signal in normal operation, that is, in the stable state.

Next, when the input voltage Vin decreases to be substantially equal to the set voltage of the output voltage, for example, when the input voltage Vin gradually decreases, in the circuit structure described above, the input voltage Vin is continuously maintained to keep the $FET_1$ in the on state in order to maintain the output voltage. Then, in the above-described circuit structure, the $FET_1$ is temporarily off controlled at a predetermined timing in order to refresh the bootstrap capacitance $C_0$. There are cases in which the practical operation frequency of the circuit decreases and the ripple amplitude of the output voltage increase, so that such an operation is performed. This is dependent on characteristics of the smoothing circuit 13 including the inductor L1 and capacitor $C_1$.

Figure 4:
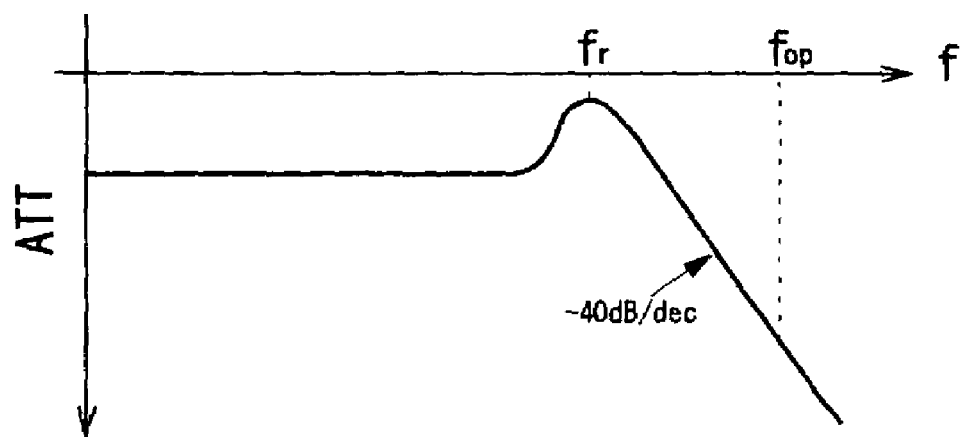
FIG. 4 shows characteristics of a smoothing circuit.
Figure 5:
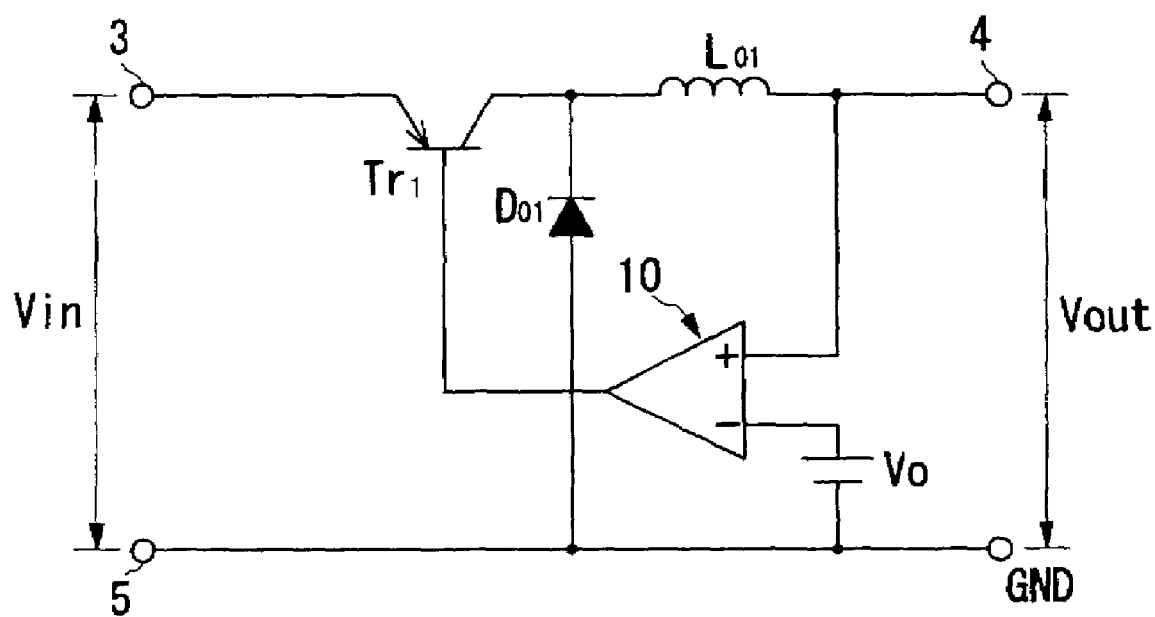
FIG. 5 shows a basic circuit of a ripple converter.
Figure 6A:
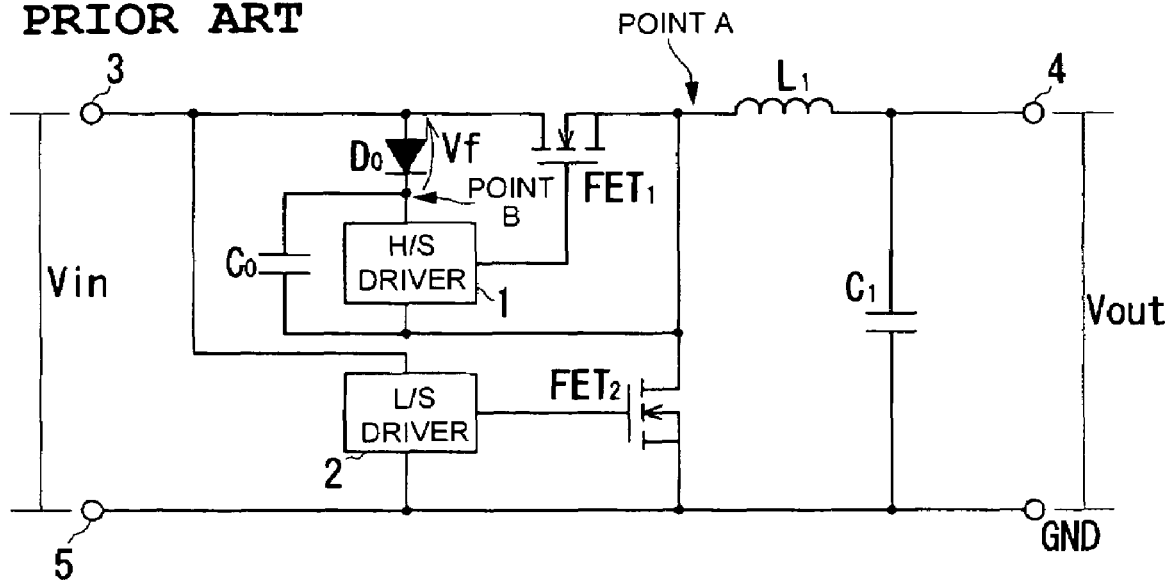
FIG. 6A is a circuit diagram of a synchronous rectification type ripple converter using an Nch FET having a related bootstrap circuit contained therein.
Figure 6B:
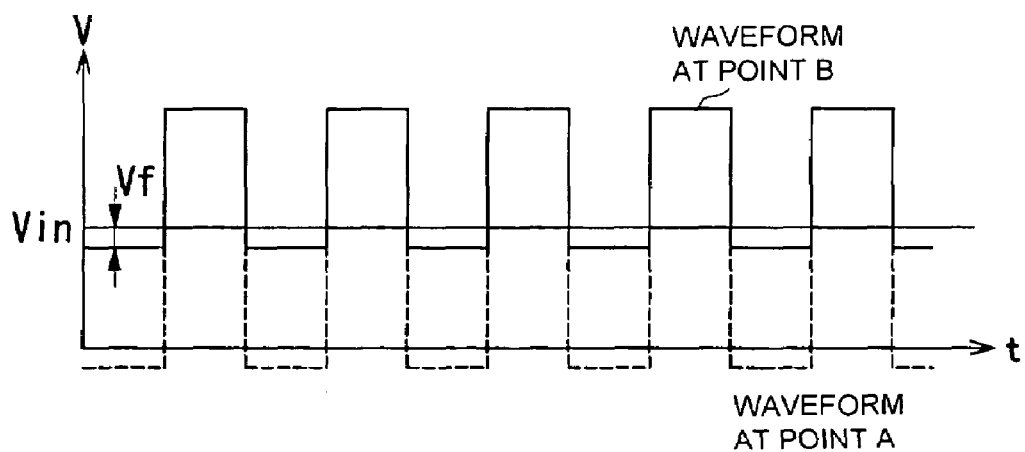
FIG. 6B shows waveforms at fixed points (point A and point B) in the circuit diagram in FIG. 6A.

FIG. 4 shows characteristics of the smoothing circuit 13, and, as shown in the drawing, in the DC-DC converter according to the present preferred embodiment, the switching frequency (repeating frequency of the switching control signal) $f_{op}$ is set to be greater than the resonance frequency $f_r$ of the smoothing circuit 13.

Typically, in designing an economical DC-DC converter, the operating frequency (switching frequency $f_{op}$) in normal operation is set to be about 100 times that of the resonance frequency $f_r$. Furthermore, in order to suppress the ripple of the output voltage Vout within a range permitted for the DC-DC converter, the operating frequency (switching frequency $f_{op}$) typically must be at least about ten times that of the resonance frequency $f_r$. Because of these restrictions, the continuous on time of the on-time limiter circuit 11 must be less than about ten times that of the switching cycle in normal operation.

Thus, by using the structure of the present preferred embodiment, even if the $FET_1$, which is a main switching element supplying switched Vin to the output terminal 4, is continuously in the on state, since an off state is temporarily inserted, the bootstrap capacitor is securely charged. In this manner, the present preferred embodiment solves the problem in the prior art. As a result, a ripple converter type DC-DC converter which stably operates is provided.

Furthermore, a ripple converter type DC-DC converter which more stably operates is provided such that the time limit in the on state is preferably set to be about three to about ten times as long as the switching control cycle in normal operation of the ripple converter.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A DC-DC converter comprising:
    an Nch FET arranged to switch an input voltage on and off;
    a smoothing circuit arranged to smooth a voltage output from the Nch FET to output the smoothed voltage;
    a comparator circuit arranged to compare a voltage output from the smoothing circuit with a set voltage to output a switching control signal for the on-off controlling; and
    a bootstrap circuit arranged to apply a higher voltage than a source voltage to a gate of the Nch FET, and including a bootstrap capacitor; wherein
    when the output voltage is in a transient state and less than a set voltage, and when a continuous on time of the Nch FET is detected and the continuous on time reaches a predetermined maximum time, a switching control signal for off controlling the Nch FET is output to the Nch FET.

2. A DC-DC converter according to claim 1, wherein a time limit of the Nch FET in the on state is set to be about three to about ten times as long as a cycle of the switching control signal in normal operation.

3. A DC-DC converter according to claim 1, wherein the smoothing circuit includes an inductor and a capacitor.

4. A DC-DC converter according to claim 1, wherein the comparator circuit includes a comparator, a plurality of resistors and a reference power supply.

5. A DC-DC converter according to claim 4, further comprising an on-time limiter circuit arranged to control the continuous on time of the Nch FET, wherein the on-time limiter circuit includes a buffer circuit connected to a signal output terminal of said comparator via a resistor.

6. A DC-DC converter according to claim 5, wherein said on-time limiter circuit further comprises at least one NPN transistor and at least one PNP transistor.

7. A DC-DC converter according to claim 1, wherein the bootstrap circuit includes a bootstrap diode and the bootstrap capacitor which are series-connected, wherein an anode of the bootstrap diode is connected to a drain of the Nch FET and an input terminal of DC-DC converter, and the bootstrap capacitor in connected to a source of the Nch FET.

8. A DC-DC converter according to claim 1, further comprising an additional Nch FET connected between a connection point of Nch FET and the smoothing circuit and a ground terminal of the DC-DC converter.

9. A DC-DC converter according to claim 1, further comprising an H/S driver circuit, wherein the gate of the Nch FET defines a control signal output terminal of the H/S driver circuit.

10. A DC-DC converter according to claim 8, further comprising an L/S driver circuit, wherein a gate of the additional Nch FET defines a control signal output terminal of the L/S driver circuit.

11. A DC-DC converter comprising:
    an Nch FET arranged to on-off control an input voltage;
    a smoothing circuit arranged to smooth a voltage output from the Nch FET to output the smoothed voltage;
    a comparator circuit arranged to compare a voltage output from the smoothing circuit with a set voltage to output a switching control signal for the on-off controlling;
    a bootstrap circuit arranged to apply a higher voltage than a source voltage to a gate of the Nch FET, and including a bootstrap capacitor; and
    an on-time limiter circuit; wherein
    when the output voltage is in a transient state and less than a set voltage, and when a continuous on time of the Nch FET is detected and the continuous on time reaches a predetermined maximum time, the on-time limiter circuit outputs a switching control signal to the Nch FET for off controlling the Nch FET.

12. A DC-DC converter according to claim 11, wherein a time limit of the Nch FET in the on state is set to be about three to about ten times as long as a cycle of the switching control signal in normal operation.

13. A DC-DC converter according to claim 11, wherein the smoothing circuit includes an inductor and a capacitor.

14. A DC-DC converter according to claim 11, wherein the comparator circuit includes a comparator, a plurality of resistors and a reference power supply.

15. A DC-DC converter according to claim 14, wherein the on-time limiter circuit includes a buffer circuit connected to a signal output terminal of said comparator via a resistor.

16. A DC-DC converter according to claim 15, wherein said on-time limiter circuit further comprises at least one NPN transistor and at least one PNP transistor.

17. A DC-DC converter according to claim 11, wherein the bootstrap circuit includes a bootstrap diode and the bootstrap capacitor which are series-connected, wherein an anode of the bootstrap diode is connected to a drain of the Nch FET and an input terminal of DC-DC converter, and the bootstrap capacitor in connected to a source of the Nch FET.

18. A DC-DC converter according to claim 11, further comprising an additional Nch FET connected between a connection point of Nch FET and the smoothing circuit and a ground terminal of the DC-DC converter.

19. A DC-DC converter according to claim 11, further comprising an H/S driver circuit, wherein the gate of the Nch FET defines a control signal output terminal of the H/S driver circuit.

20. A DC-DC converter according to claim 18, further comprising an L/S driver circuit, wherein a gate of the additional Nch FET defines a control signal output terminal of the L/S driver circuit.

* * * * *